United States Patent [19]

VanDonkelaar et al.

[11] Patent Number: 5,726,431

[45] Date of Patent: Mar. 10, 1998

[54] APPARATUS FOR PRINTING A SHELF TAG

[75] Inventors: Jon L. VanDonkelaar, Bellbrook; David Wissel, Lebanon, both of Ohio

[73] Assignee: Bass, Inc., Dayton, Ohio

[21] Appl. No.: 667,070

[22] Filed: Jun. 20, 1996

[51] Int. Cl.$^6$ .................................................. G06K 15/00
[52] U.S. Cl. .......................... 235/383; 235/375; 235/462; 235/472; 235/385
[58] Field of Search ........................... 235/383, 375, 235/378, 385, 462, 472; 395/220, 222

[56] References Cited

U.S. PATENT DOCUMENTS

| | | | |
|---|---|---|---|
| 4,028,537 | 6/1977 | Snow | 235/383 |
| 4,084,742 | 4/1978 | Silverman | 235/383 |
| 4,365,148 | 12/1982 | Whitney | 235/383 |
| 4,529,871 | 7/1985 | Davidson | 235/383 |
| 4,550,246 | 10/1985 | Markman | 235/383 X |
| 4,654,514 | 3/1987 | Watson et al. | 235/385 |
| 4,731,525 | 3/1988 | Hice | 235/383 |
| 4,734,710 | 3/1988 | Sato et al. | 235/385 X |
| 4,746,932 | 5/1988 | Sato | 235/385 X |
| 5,047,615 | 9/1991 | Fukumoto et al. | 235/472 X |
| 5,065,002 | 11/1991 | Tashiro et al. | 235/472 |
| 5,365,050 | 11/1994 | Worthington et al. | 235/472 |
| 5,382,779 | 1/1995 | Gupta | 235/383 |
| 5,410,141 | 4/1995 | Koenck et al. | 235/472 |
| 5,423,617 | 6/1995 | Marsh et al. | 400/82 |
| 5,428,617 | 6/1995 | Urushima | 371/2.1 |
| 5,459,456 | 10/1995 | Hosack et al. | 340/825.44 |
| 5,463,596 | 10/1995 | Siefken | 367/98 |
| 5,481,249 | 1/1996 | Sato | 340/825.06 |
| 5,493,107 | 2/1996 | Gupta et al. | 235/383 |
| 5,602,377 | 2/1997 | Beller et al. | 235/385 X |

OTHER PUBLICATIONS

"New UHF Receiver Architecture Achieves High Sensitivity and Very Low Power Consumption", Darrel Lash, Published at RF Expo West, Jan. 1995.

*Primary Examiner*—Donald T. Hajec
*Assistant Examiner*—Michael G. Lee
*Attorney, Agent, or Firm*—Biebel & French

[57] ABSTRACT

A shelf tag printing system includes a portable terminal in radio communication with a base station and a portable printer in wireless communication with the portable terminal. The portable terminal has a bar code scanner which reads product bar codes for radio transmission to the base station. The base station responds with informational signals indicating legends to be printed upon shelf tags by the printer. These signals are received by the portable terminal and relayed to the printer. Communication between the portable terminal and the printer is one-way via a surface wave acoustic resonator in the portable terminal and an amplifier sequenced hybrid receiver in the printer.

3 Claims, 3 Drawing Sheets

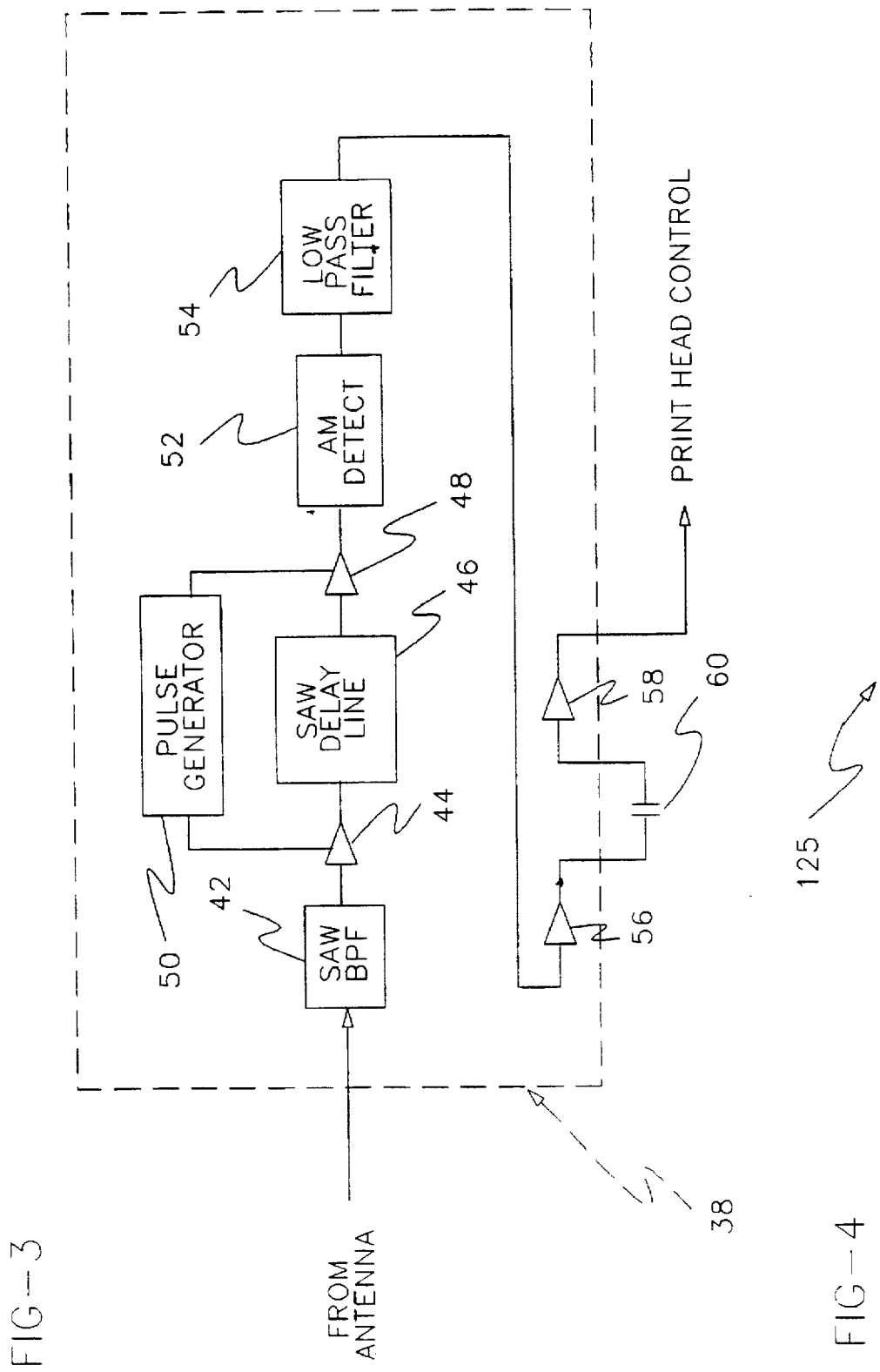

APPARATUS FOR PRINTING A SHELF TAG

BACKGROUND OF THE INVENTION

This invention relates to the field of retail merchandising and more particularly to apparatus for printing human readable information upon shelf tags.

In times past retail stores, particularly food markets, marked prices upon every item stocked on merchandising shelves. Customers were accustomed to reading the prices marked upon the products and comparing those prices against cash register receipts to verify the accuracy of the bill. However, in recent times there has developed a practice of printing bar codes upon nearly all types of packaged products. Such bar codes uniquely identify the products upon which they are placed and are positioned on the package in such a manner as to facilitate reading by scanners at point-of-sale terminals. Stores which are equipped with such terminals will relay the scanned bar codes to a central computer. This provides pricing information which is sent back to the inquiring terminal. Such merchandising requires no price marking on the product being sold, and therefore many stores have discontinued price marking all together. Consequently it has become necessary to provide shelf tags which display product identifying information and associated prices, all in human readable form. These shelf tags are easily damaged, moved or lost and are quickly outdated due to frequent price changes.

It will be appreciated that means must be provided for quickly verifying shelf tag information. Therefore stock clerks are issued hand-held terminal units containing their own bar code scanners. These terminal units are equipped for radio communication with a base station located near the central computer. Such remote terminal units may be configured as taught in any of numerous prior art patents, for example Koenck et al. U.S. Pat. No. 5,410,141 and Worthington et al. U.S. Pat. No. 5,365,040.

When a stock clerk wishes to verify a price appearing on a shelf tag, he uses his hand-held terminal to scan one of the products in question. The bar code information then is transmitted to the base station, and the central computer responds with the correct price. This price is shown on a visual display which is built into the terminal. It is also becoming a common practice to provide the stock clerk with a portable printer so as to enable on-the-spot replacement of erroneous or missing shelf tags. A typical printer is connected to the hand-held terminal unit either by a cable or a radio link. However, radio links are preferable, because cables are less flexible in use and are prone to failure caused by physical stresses.

A wide variety of printers are available for such purposes. They may be laser printers, thermal printers, any of numerous types of ink jet printers, or even more primitive wire matrix printers. One suitable printer is sold by Monarch Marking Corporation of Dayton, Ohio under the trademark Rascal. Such printers are provided with wireless modulator demodulator communication packages which communicate with the outside world via either a simplex or a duplex radio link. A suitable communication link is sold by Monarch Marking under the trademark Wanderer and utilizes a protocol which is completely described in documentation available from the manufacturer.

SUMMARY OF THE INVENTION

This invention provides an improved shelf tag printing system including a portable terminal in radio communication with a base station and a portable printer in wireless communication with the portable terminal. The portable terminal has a bar code scanner which reads product bar codes for radio transmission to the base station. The base station responds with informational signals indicating legends to be printed upon shelf tags by the printer. These signals are received by the portable terminal and relayed to the printer.

Communication between the portable terminal and the printer is one-way via a surface wave acoustic resonator in the portable terminal and an amplifier sequenced hybrid receiver in the printer. The communication link operates reliably at low power due to the relatively short distance between the portable terminal and the printer and due, also, to a unique signal format. Printing control commands are transmitted a plurality of times (preferably three) and are checked at the receiving end by a cyclic redundancy check using a 16-bit checksum. The printer selects one of the three sets of printing control commands which is determined to be error-free and proceeds to print the required shelf tag.

It is therefore an object of the invention to provide improved apparatus for printing shelf tags.

It is another object of the invention to provide an improved communication link between a portable terminal and a nearby portable printer.

Other and further objects and advantages of the invention will be apparent from the following description, the accompanying drawings and the appended claims.

BRIEF DESCRIPTION OF THE DRAWINGS

FIG. 3 is a schematic illustration of an amplifier-sequenced hybrid receiver.

FIG. 4 is a schematic illustration of repeated surface acoustic wave messages.

DESCRIPTION OF THE PREFERRED EMBODIMENT

Figure 1:
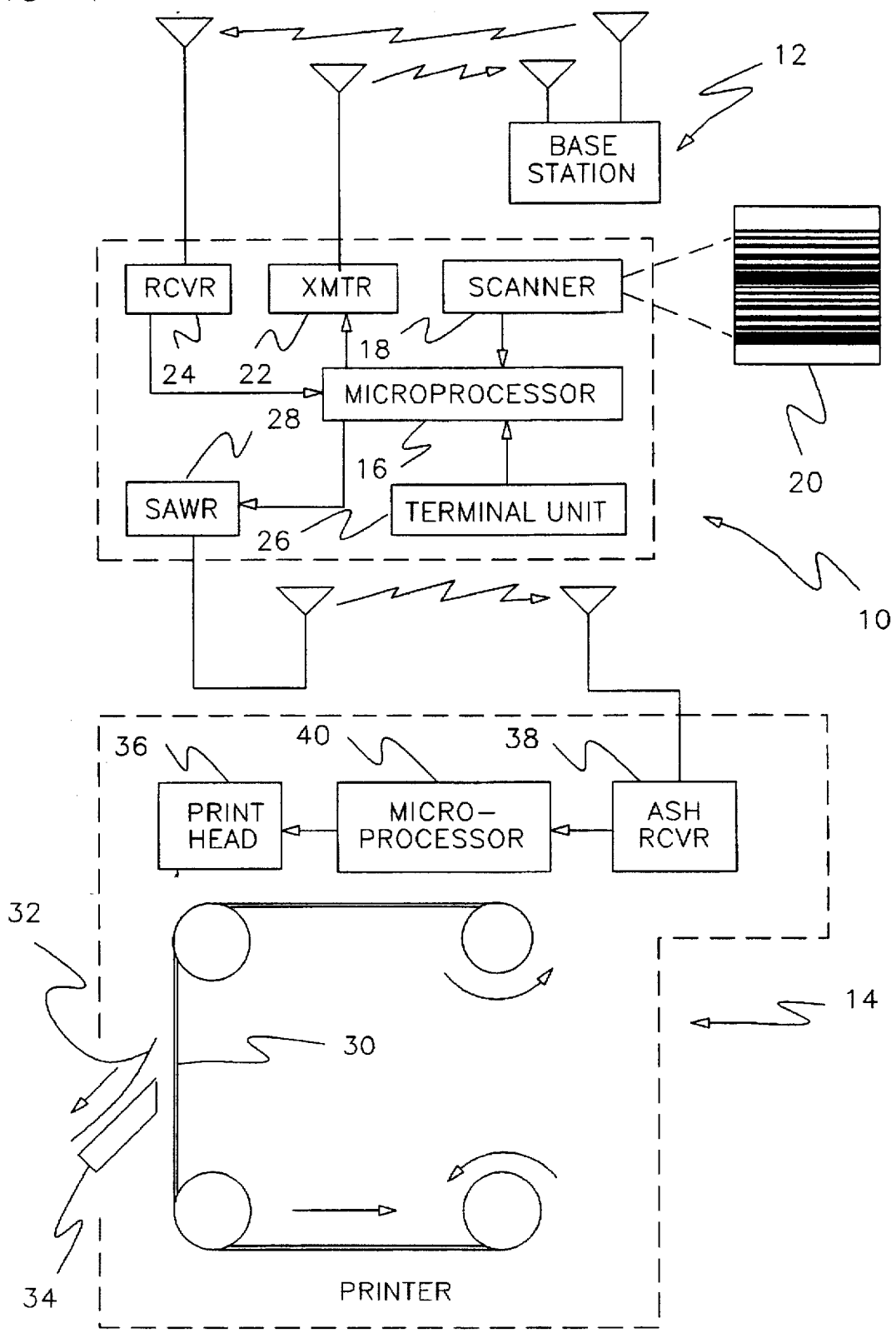
FIG. 1 is a schematic illustration of a shelf tag printing system according to the present invention.

A shelf tag printing system in accordance with the present invention may be configured as generally illustrated in FIG. 1. The system comprises a terminal unit 10 in communication with a printer unit 14. Terminal unit 10 also communicates with a base station 12. Base station 12 is in communication with a computer (not illustrated) which stores product information responsive to queries generated by terminal unit 10.

Terminal unit 10 comprises a microprocessor 16 acting under control of a keyboard 26 and connected for communication with a scanner 18, a radio transmitter 22, a radio receiver 24 and a surface acoustic wave resonator 28. Scanner 18 preferably is a laser scanner capable of scanning bar codes on a product label such as label 20. Label 20 may be imprinted upon a product package and may identify the contents of the package. Scanner 18 reads the bar code and generates a digital representation thereof. This digital representation is communicated to microprocessor 16. A human operator then enters instructions into keyboard 26 or scans a bar code label so as to cause microprocessor 16 to formulate a query requesting information regarding the product associated with the label 20. The query may, for instance, request all information required for printing a new shelf tag. That might include the size of the package, the type of goods, the manufacturer and the price.

Microprocessor 16 formulates an appropriate query and relays it to transmitter 22 for transmission to base station 12. Base station 12 then consults the central computer and transmits the desired information to receiver 24. Receiver 24 generates a signal indicating the response of the base station 12 to the query and sends the signal to microprocessor 16. Microprocessor 16 then generates a printing command which is used for modulation of a radio frequency signal generated by surface acoustic wave resonator 28. As described in more detail below, surface acoustic wave resonator 28 may generate surface waves at a frequency of 433.92 MHz for short range radio transmission to printer unit 14. While other frequencies could be used, this frequency is preferred, because it is available for low power transmissions without a license from the government. A suitable resonator for such purposes is available from RF Monolithics, Inc. under part number R02101A.

The radio frequency waves on the surface of SAWR 28 are radiated into the surrounding space and travel to printer unit 14 which is located a short distance, typically less than about 10 feet, from terminal unit 10. The signal generated by SAWR 28 is received by amplifier sequenced hybrid receiver 38 which preferably may be a device of the type sold by RF Monolithics, Inc. under part number RX1020. All communications between resonator 28 and receiver 38 are on a simplex basis. That is, resonator 28 merely transmits signals without any indication of reception by receiver 38.

It will be appreciated that signals transmitted by resonator 28 may become degraded or corrupted for any of numerous reasons. Therefore microprocessor 16 causes resonator 28 to transmit printing commands formatted as indicated in FIG. 4. Thus a communication packet 25 commences by transmission of a clear signal. The clear signal is transmitted three times and is followed by three complete transmissions of the printing command.

A printing command consists of a printer identification code followed by printing data followed by a check signal. The check signal preferably is a signal appropriate for performance of a cyclic-redundancy check (CRC) using 16 bits for a checksum. For detailed information regarding the performance of such a check, reference may be made to a reference manual entitled "Asynchronous Communications Library for C" available from Greenleaf Software, Inc. of Dallas, Tex.

As illustrated in FIG. 4, resonator 28 transmits three identical radio messages in sequence. Receiver 38 receives these messages and transmits them to microprocessor 40 which is the internal control unit for printing unit 14. Microprocessor 40 stores the three messages in a nonvolatile random access memory and performs the CRC 16 check. Thereafter an error-free copy of the messages is used by microprocessor 40 for creating formatted printing control signals for print head 36. Typically the data portion of the printing command signals consists of a series of ASCII codes. Each ASCII code may be seven bits in length and may represent a printed character. Microprocessor 40 responds to a seven bit ASCII code by generating a dot matrix representation of the character corresponding to that code. A series of print/no-print signals corresponding to black/white pixels in the corresponding dot matrix are applied to a series of printing elements in print head 36. A preferred printer for such purposes is sold by Monarch Marketing of Dayton, Ohio under the trademark Rascal, as noted previously. Print head 36 then imprints an informational legend upon a tag 32 being transported along a support strip 30. Support strip 30 may be transported into printing relation with print head 36 by appropriate feed means. After being printed by print head 36, tag 32 may be stripped from support strip 30 by means of a blade 34.

Figure 2:
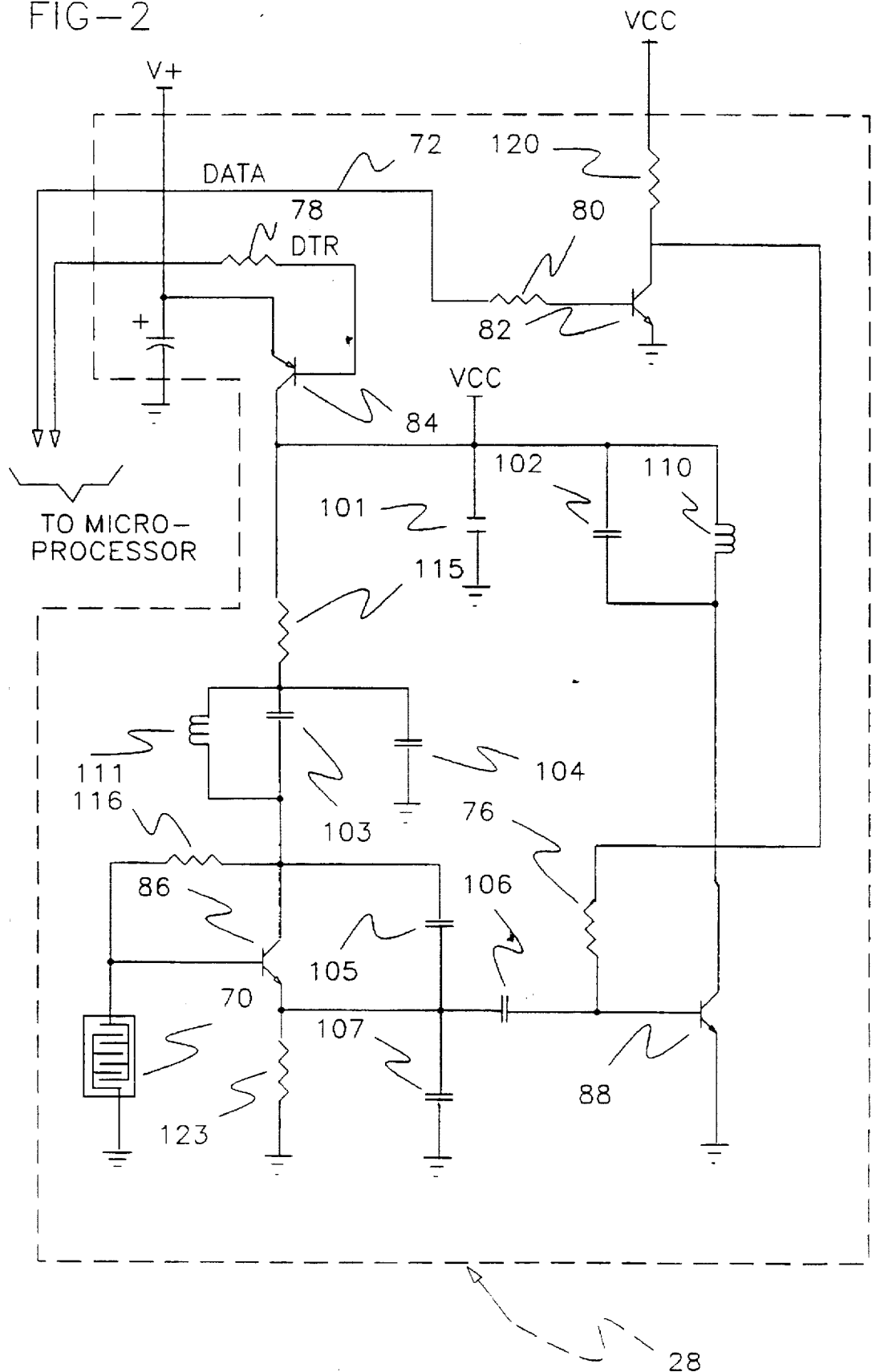
FIG. 2 is a schematic illustration of a surface acoustic wave resonator.

The details of SAWR 28 are shown in FIG. 2. The key element of SAWR 28 is a chip 70 which generates surface waves at a radio frequency of 433.92 MHz. Chip 70 is enabled by a DTR signal applied to line 74. The DTR signal is applied to a resistor 78 connected to the base of a transistor 84. The DTR signal causes transistor 84 to become conductive and supply current across a resistor 115 to an oscillation circuit comprising a transistor 86, resistors 116, 123 and capacitors 105, 107. This excites oscillations at a frequency of 433.92 MHz in transistor 86 and creates an alternating drive signal for the chip 70. The drive signal is modulated by data signals applied across a resistor 104 to the base of another transistor 88.

Data signals in the form of a series of zeros and ones are applied by a microprocessor 16 to line 72 of resonator circuit 28. These data signals are applied through a resistor 80 to the base of a transistor 82. Transistor 82 is connected to a VCC supply through a resistor 120 and inverts the sign of the data appearing on data line 72. The inverted signal controls ON/OFF current conduction through transistor 88, which in turn applies a binary modulation envelope to the high frequency surface waves being generated by chip 70. Signal filtering is provided by capacitors 101, 102, 103, 104 and 106 and coils 110, 111.

As noted above, data signals appearing on line 72 are inverted before modulating the surface waves produced by circuit 70. The modulated signal is received by receiver 38 and again inverted in the process. This produces control signals for microprocessor 40 which have the same boolean sense as the control signals on line 72.

Referring now to FIG. 3, modulated signals received from resonator 28 are connected to a surface acoustic wave device connected for use as a band pass filter 42. Output signals from band pass filter 42 are applied to an RF amplifier 44 which is turned on by a pulse generator 50. The output of RF amplifier 44 is applied to the input of a surface acoustic wave delay line 46. When the signal emerges from delay line 46, then pulse generator 50 turns off RF amplifier 44 and turns on a second RF amplifier 48. Output signals from second RF amplifier 48 are applied to an AM detector 52 and then are filtered by a low pass filter 54. This removes the carrier frequency and provides a baseband output which is amplified by an amplifier 56. The baseband output signal from amplifier 56 is raw demodulated, unprocessed data. The level of this data is dependant upon the input RF level. This signal is capacitively coupled via a capacitor 60 to the input of a comparator 58 which converts it into a binary format. The binary signal then is relayed to microprocessor 40 for driving print head 36.

While the forms of apparatus herein described constitute preferred embodiments of the invention, it is to be understood that the invention is not limited to these precise forms of apparatus and that changes may be made therein without departing from the scope of the invention.

What is claimed is:

1. A shelf tag printing system comprising:
   (a) a hand-held terminal unit including:
   (1) a scanner for scanning a product marked by a machine readable identifying code and generating a corresponding scanning signal,
   (2) a microprocessor connected for receiving said scanning signal and generating a query related thereto, said microprocessor being further connected for processing a signal responsive to said query and generating a corresponding printing command,
   (3) a radio transmitter connected for receiving said query from said microprocessor and transmitting a corresponding radio signal to a base station, (4) a radio receiver for receiving a radio transmission from a base station and correspondingly generating said signal responsive to said query, and (5) a surface acoustic wave resonator connected for receiving said printing command and transmitting a corresponding surface wave message; and (b) a portable printing unit including:

(1) an amplifier sequenced hybrid receiver for receiving said surface wave message, (2) data processing means for identifying erroneous ones of said surface wave acoustic messages and generating formatted print head control signals corresponding to one of said surface wave acoustic messages which is error-free, (3) a print head responsive to said formatted print head control signals for printing a corresponding informational legend, and (4) feed means for feeding a shelf tag into printing relation with said print head to receive said informational legend.

2. A shelf tag printing system comprising:

(a) a bar code reader for reading a bar code imprinted upon a product and generating a corresponding bar code signal, (b) a microprocessor connected for receiving said bar code signal and generating a query related thereto, said microprocessor being further connected for processing a signal responsive to said query and generating a corresponding printing command, (c) a radio transmitter connected for receiving said query from said microprocessor and transmitting a corresponding radio signal to a base station, (d) a radio receiver for receiving a radio transmission from a base station and correspondingly generating said signal responsive to said query, (e) a surface acoustic wave resonator connected for receiving said printing command and transmitting a corresponding surface wave message, (f) an amplifier sequenced hybrid receiver for receiving said surface wave message, (g) a print head responsive to said surface wave message for printing a corresponding informational legend, and (h) feed means for feeding a shelf tag into printing relation with said print head to receive said informational legend.

3. A shelf tag printing system comprising:

(a) a hand-held terminal unit including:

(1) scanning means for generating a scanning signal corresponding to a bar code imprinted upon a product, (2) a microprocessor connected for receiving said scanning signal and generating a query related thereto, said microprocessor being further connected for processing a signal responsive to said query and generating a corresponding printing command, (3) a radio transmitter connected for receiving said query from said microprocessor and transmitting a corresponding radio signal to a base station, (4) a radio receiver for receiving a radio transmission from a base station and correspondingly generating said signal responsive to said query, and (5) a surface acoustic wave resonator connected for receiving said printing command and repeatedly transmitting a corresponding surface wave message; and (b) a portable printing unit including:

(1) an amplifier sequenced hybrid receiver for receiving said surface wave message and repetitions thereof, (2) signal processing means for identifying erroneous ones of said surface wave messages and generating formatted print head control signals corresponding to one of said surface wave messages which is error-free, (3) a print head responsive to said formatted print head control signals for printing a corresponding informational legend, and (4) feed means for feeding a shelf tag into printing relation with said print head to receive said informational legend.

* * * * *